US007395663B2

(12) United States Patent
Thompson et al.

(10) Patent No.: US 7,395,663 B2
(45) Date of Patent: Jul. 8, 2008

(54) SYSTEM FOR AND METHOD OF LOCKING A ROLL SUSPENSION ARRANGEMENT FOR A BOOM ASSEMBLY MOUNTED ON AN AGRICULTURAL SPRAYER

(75) Inventors: Dennis G. Thompson, Saskatoon (CA); Dennis W. Chahley, Martensville (CA)

(73) Assignee: CNH Canada, Ltd. (CA)

( * ) Notice: Subject to any disclaimer, the term of this patent is extended or adjusted under 35 U.S.C. 154(b) by 282 days.

(21) Appl. No.: 11/424,348

(22) Filed: Jun. 15, 2006

(65) Prior Publication Data
US 2007/0289438 A1 Dec. 20, 2007

(51) Int. Cl.
*F15B 13/16* (2006.01)
(52) U.S. Cl. ............................. 60/403; 60/404; 60/406
(58) Field of Classification Search .................. 60/403, 60/404, 406
See application file for complete search history.

(56) References Cited

U.S. PATENT DOCUMENTS

| 4,288,034 | A |  | 9/1981 | Widmer et al. |
|---|---|---|---|---|
| 4,372,492 | A |  | 2/1983 | Blumenshine |
| 4,394,968 | A |  | 7/1983 | Tyler |
| 5,335,856 | A | * | 8/1994 | Nathan ........................ 239/164 |
| 5,887,390 | A |  | 3/1999 | Schulz et al. |
| 5,988,528 | A |  | 11/1999 | Krohn et al. |
| 5,992,759 | A |  | 11/1999 | Patterson |
| 6,053,419 | A |  | 4/2000 | Krohn et al. |
| 6,293,475 | B1 |  | 9/2001 | Sobolik |
| 6,315,218 | B1 |  | 11/2001 | Guesdon |
| 6,343,661 | B1 |  | 2/2002 | Thompson et al. |
| 6,776,356 | B2 |  | 8/2004 | Maliteare |
| 6,834,223 | B2 |  | 12/2004 | Strelioff et al. |
| 2006/0118654 | A1 | * | 6/2006 | Shivak ........................ 239/166 |

* cited by examiner

*Primary Examiner*—Igor Kershteyn
(74) *Attorney, Agent, or Firm*—Rebecca Henkel

(57) ABSTRACT

A system to lock a roll-suspension arrangement operatively connected to allow pivotal movement of a boom assembly about a fore-and-aft axis independent of a carrier frame is provided. The system includes an actuator cylinder having an end movable in a linear direction relative to a fixed end. The fixed end of the actuator cylinder is connected at the carrier frame, and the movable end is connected at the boom assembly. The system further includes a lock valve located in fluid communication with the actuator cylinder. The lock valve in a closed position prevents a fluid flow therethrough so as to restrain movement of the actuator cylinder and rotation of the boom assembly with respect to the carrier frame. In an open position, the lock valve releases movement of the actuator cylinder so that the boom assembly freely pivots independently of the carrier frame.

20 Claims, 5 Drawing Sheets

SYSTEM FOR AND METHOD OF LOCKING A ROLL SUSPENSION ARRANGEMENT FOR A BOOM ASSEMBLY MOUNTED ON AN AGRICULTURAL SPRAYER

RELATED APPLICATIONS

This application is related to U.S. application Ser. No. 11/424,371 entitled "Suspension Arrangement For a Boom Assembly Mounted on an Agricultural Sprayer," filed simultaneously with this application and hereby incorporated herein by reference in its entirety.

BACKGROUND OF THE INVENTION

1. Field of the Invention

The invention relates to a lock assembly for an agricultural sprayer, and more specifically, relates to a lock assembly operable to restrain a boom assembly from rotating about a roll-suspension arrangement with respect to a lift linkage.

2. Discussion of Related Art

Boom assemblies are commonly used on agricultural vehicles or self-propelled implements, such as sprayers or planters, to dispense seed, fertilizer, insecticide, herbicide, etc. and other miscellaneous agricultural materials. A typical boom assembly includes a pair of booms configured to pivot or fold between operative and inoperative positions relative to the boom support vehicle. In the operative position, the booms commonly extend in a laterally outward direction from the boom support vehicle such that the agricultural applicator covers a large surface area with each pass across a field. The weight of the boom assembly generally correlates with its operative length.

Upon completing distribution of the agricultural materials to the field, the booms are generally swung, pivoted or folded in a forwardly or rearwardly direction to a folded, inoperative position. The preferred folded, inoperative position of the booms are in alignment generally parallel to the direction of travel of the support vehicle such that the boom assembly and support vehicle have a narrow profile for transport from the field and on a roadway. Folding or swinging the booms is typically performed manually or by a hydraulic or pneumatic system mounted between the booms and the boom support vehicle. Before transport, the booms are generally seated in or on a boom cradle or saddle structure such that the boom assemblies are supported for travel on the roadway.

To accommodate the requirement for such elongated booms, manufacturers have developed suspension arrangements for the boom assembly that are operable to reduce miscellaneous stresses imposed on the boom assembly, the support framework, and/or the boom-support vehicles that are associated operation in the field. In addition, suspension arrangements have been developed so as to maintain a uniform distance or parallel altitude between the booms of the boom assembly and the ground to maintain ideal spray coverage. A certain known "roll-suspension" arrangement includes a single pivot connection operatively connected between the boom assembly and the carrying or stationary frame in a manner that allows the boom to swing in a pendulum-like manner that is independent of the stationary frame. The addition of springs and/or shock-absorbers and/or dampers are beneficial in damping the movement of booms relative to the boom-support implement and/or vehicle when operating in rough terrain.

However, known suspension arrangements employed on boom support implements or vehicles have drawbacks. For example, when folding the boom assembly to a proper position so as to lock for transport, problems can occur. Even though the left and right booms of the boom assembly may be connected on the same hydraulic or pneumatic system, one boom may fold before the other and cause the boom assembly to become unbalanced and/or roll to one side. The boom assembly may also be unbalanced because the boom support vehicle or implement is parked on uneven ground. From an unbalanced position, the left and right booms may not fold to a proper position so as to be locked for transport.

Therefore, there is a need or desire for a lock assembly operable to secure a suspension arrangement of a boom assembly before pivoting the boom to a folded position for transport. The lock assembly should also be configured to be utilized with a wide variety of vehicles in addition to those related to agriculture.

SUMMARY OF THE INVENTION

The present invention provides a system for and a method of locking a suspension arrangement operatively connected between a boom assembly and a carrier frame supported on a boom support implement or vehicle that meets the desires and needs described above. The lock system of the present invention thus enhances the smooth transition of the boom assembly from an extended, operative position to a folded, inoperative position for transport. The lock system of the present invention also enhances maintenance of the boom assembly in a balanced state about a roll suspension arrangement, which allows one boom of the boom assembly to be folded or extended at a time while the other boom remains stationary. The lock system of the invention is also desirable in some spraying situations. For example, the lock system is desirable to restrain one side of boom in a folded position for transport while maintaining the other side of boom in an extended position for spraying. In another example, the lock system is desirable so as to intermittently lock rotation of the boom to counteract induced rotation in the boom that may occur when hydraulically adjusting the boom angle to one side of the boom.

In a first embodiment of the present invention, a lock system for a suspension arrangement operatively connected between the boom assembly and the carrier frame is provided. The suspension arrangement is operable to allow the boom assembly to swing about a pivot independently of the carrier frame. The implement or vehicle also includes a lift linkage operable to move the carrier frame and connected boom assembly between a lowered, operative position and a raised, inoperative position. The carrier frame is pivotally coupled at the lift linkage. The lock system generally includes an actuator cylinder having a first end and a second end movable in a linear direction with respect to the first end. The first end is connected at the carrier frame and the second end is connected at the boom assembly. The lock assembly further includes and a lock valve in fluid communication with the actuator cylinder. In a closed position, the lock valve prevents a fluid flow therethrough so as to restrain movement of the actuator cylinder and rotation of the boom assembly with respect to the carrier frame. In an open position, the lock valve releases movement of the actuator cylinder such that the boom assembly pivots about the fore-and-aft axis independently of the carrier frame.

The preferred lock valve is biased to an open position. The lock valve is in fluid communication with a pilot line, but the pilot line is not in fluid communication with the actuator cylinder. The pilot line communicates a signal indicative of movement of the boom assembly from the extended position to the folding position. In response to the signal, the lock valve moves from the open to the closed position. The lock valve in the closed position prevents fluid flow to and from the actuator cylinder.

The preferred lock system further includes a pressure regulating valve connected in fluid communication with the actuator cylinder so as maintain a generally constant fluid pressure at the actuator cylinder during operation of the roll suspension arrangement. The preferred lock system further includes a pilot operated check valve in fluid communication via a pilot line with the lock valve. The pilot operated check valve is connected in fluid communication with a lift circuit that includes the actuator cylinders configured to move or lift the boom assembly between raised and lowered positions in the vertical direction. When in an open position, the pilot-operated check valve provides a signal via fluid flow which causes the lock valve to move from an open to a closed position. The pilot operated check valve is configured to retain fluid pressure in the pilot line so as to maintain the lock valve in a closed position when the boom assembly is positioned in the folded, inoperative position for transport. After unfolding the boom assembly and after using the lift circuit to lower boom assembly for field operation, fluid pressure to drive the lift or folding actuators is lost. Upon detecting this loss in fluid pressure, the pilot operated check valve is automatically opened and fluid pressure is relieved to the lock valve so as to allow the lock valve to bias open, thereby unlocking the roll suspension arrangement to operate freely.

The preferred lock system further includes an accumulator, and a variably metered orifice connected in fluid communication to restrict a fluid flow between the accumulator and the actuator cylinder, wherein a rotation of the boom assembly in a first direction relative to the carrier frame causes fluid flow from the actuator cylinder through the variably metered orifice into the accumulator, and rotation of the boom in a second direction opposite the first direction causes fluid flow from the accumulator through the variably metered orifice into the actuator cylinder. The rotation of the boom assembly in the first and second directions about the suspension arrangement does not cause release of fluid flow from the lock system. The preferred type of lock system is hydraulic-driven, yet the lock system can alternatively be electronically- or pneumatically-driven.

In another embodiment, the present invention provides an agricultural sprayer that includes a carrier frame in support of a boom assembly from a wheeled main frame. The sprayer further includes a suspension arrangement operatively connected to allow the boom assembly to pivot independently with respect to the carrier frame. The sprayer also includes a lift linkage pivotally connected to move the carrier frame and attached boom assembly between a lowered, operative position and a raised, inoperative position. The sprayer further includes a lock system operable to restrain movement of the boom assembly and suspension arrangement with respect to the carrier frame. The lock system includes an actuator cylinder having a first end and a second end movable in a linear direction with respect to the first end. The first end of the actuator cylinder is connected at the carrier frame and the second end is connected at the boom assembly. The lock system further includes a lock valve in fluid communication with the actuator cylinder. In a closed position, the lock valve prevents a fluid flow therethrough so as to restrain movement of the actuator cylinder and rotation of the boom assembly with respect to the carrier frame. In an open position, the lock valve releases movement of fluid flow to and from the actuator cylinder such that the boom assembly freely pivots about the fore-and-aft axis of the suspension arrangement independently of the carrier frame.

In accordance with another aspect of the invention, a method of locking a suspension arrangement operatively connected between a boom assembly and a carrier frame is provided, substantially in accordance with the foregoing summary.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE INVENTION

Figure 1:
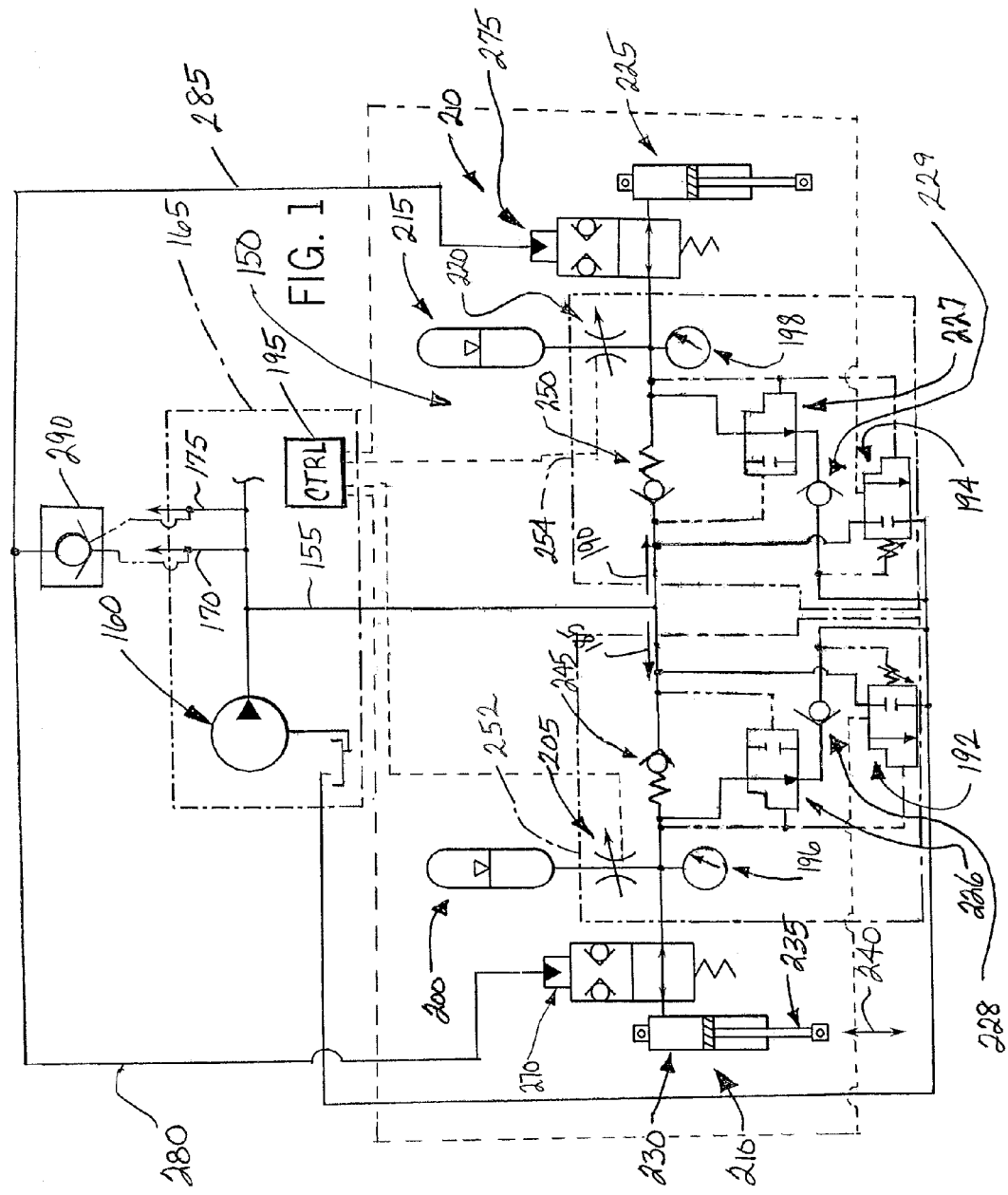
FIG. 1 illustrates a hydraulic circuit diagram of a lock system of the present invention.
Figure 5:
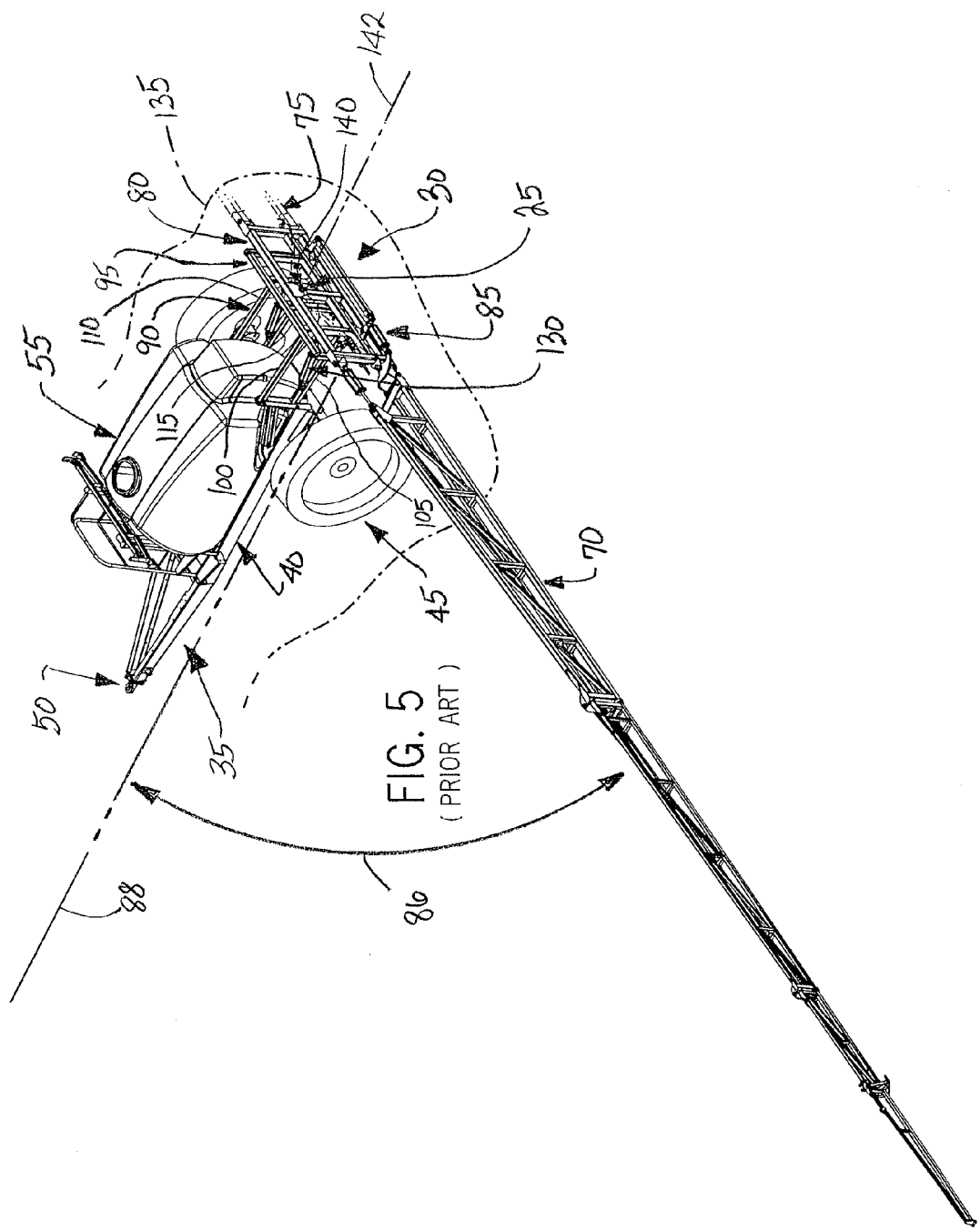
FIG. 5 illustrates a partial perspective view of a known agricultural sprayer in support of a boom assembly, the boom assembly in an extended, operative position.

FIG. 1 illustrates a lock system 20 in accordance with the present invention generally configured to restrain or lock a "roll-suspension" arrangement 25 employed in pivotal support of a boom assembly 30 on a boom support implement 35 (illustrated in FIG. 5).

Referring to FIG. 5, the exemplary boom support implement 35 is a conventional agricultural sprayer implement of a type commonly used to apply crop pesticides, nutrients or animal/human waste (sludge) to soils, typically before and after planting in the spring and/or after harvest in the fall. The boom support implement 35 generally includes a main frame 40 supported on plurality of oversized wheel assemblies 45 and a hitch 50 operable to be towed by a tow vehicle (not shown) across a field. The main frame 40 is generally configured in support of a reservoir or storage tank 55. With the booms assembly 30 in the extended, operative position (as illustrated in FIG. 5), agricultural product is communicated in a known manner from the reservoir 55 to a series of spray nozzles (not shown) for distribution across a wide surface area of the field.

Still referring specifically to FIG. 5, the boom assembly 30 generally includes a left boom 70 and a right boom 75, each mounted by the series of nozzles in fluid connection with the reservoir 55. The boom assembly 30 further includes a central frame 80 in pivotal support of the left and right booms 70 and 75. The left and right booms 70 and 75 each are pivotable by a pivot actuator mechanism(s) 85 about a generally vertical axis in a known manner so as to move (as illustrated by arrow and reference 86) the booms 70 and 75 in a generally horizontal direction between the extended, operative position (see FIG. 5) and the folded, inoperative position (illustrated in dashed line and by reference 88 also in FIG. 5). The exemplary pivot actuator mechanism 85 is a conventional hydraulic-driven mechanism. Yet it is understood that other types of pivot actuator mechanism 85 (e.g., pneumatic-driven, electrical-driven, etc.) can be used.

The central frame 80 of the boom assembly 30 is coupled to a lift linkage assembly 90 by a carrier frame 95. The carrier frame 95 is generally a conventional frame structure coupled in support of the boom assembly 30 at the lift linkage assembly 90 (See FIG. 5). The lift linkage assembly 90 is generally operable to move the carrier frame 95 and attached boom assembly 30 between a lowered, operative position (FIG. 6) and a raised, inoperative position (not shown). The exemplary lift linkage assembly 90 generally includes an upper left linkage 100 and a lower left linkage 105, and an upper right linkage 110 (See FIG. 2) and lower right linkage 115. One end of each of the upper and lower left linkages 100 and 105 and the upper and lower right linkages 110 and 115 is pivotally attached at the carrier frame 95 so as to rotate about a horizontal axis. The other end of the each of the upper and lower left linkages 100 and 105 and the upper and lower right linkages 110 and 115 is pivotally attached at the main frame 40 so as to rotate about a horizontal axis.

Still referring specifically to FIG. 5, a conventional lift actuator mechanism(s) 130 (e.g., hydraulic cylinder, pneumatic cylinder, etc.) is configured to drive or cause the lift linkage assembly 90 to move the carrier frame 95 and supported boom assembly 30 in a generally vertical direction between the lowered, operative position (See FIG. 5) and the raised, inoperative position (not shown). Once the lift linkage assembly 90 has moved the boom assembly 30 upwardly in the vertical direction to the raised, inoperative position, the conventional pivot actuator mechanism(s) 85 is operable to move one or both of the booms 70 and 75 of the boom assembly 30 about a vertical axis in a horizontal direction to the folded, inoperative position (illustrated in phantom line in FIG. 5) for transport.

Referring now to FIGS. 2-5, the "roll" suspension arrangement 25 operatively connects the carrier frame 95 and the boom assembly 30 such that the boom assembly 30 is operable to roll or rotate independent of the carrier frame 95 and lift linkage assembly 90. Thereby, the suspension arrangement 25 is generally operable in a conventional manner to maintain a uniform distance between or parallel alignment of the booms 70 and 75 of the boom assembly 30 relative to the ground 135. The roll suspension arrangement 25 includes a generally central pivot connection 140 connected between the central frame 80 of the boom assembly 30 and the carrier frame 95. The pivot connection 140 defines a generally horizontal, fore-and-aft aligned axis 142 (See FIG. 5) about which the boom assembly 30 swings in a pendulum-type manner independently of the carrier frame 95.

As shown in FIGS. 1 and 2-4, a system 150 is provided in combination with the suspension arrangement 25 so as to reduce or limit oscillating movement of the boom assembly 30 about the pivot connection 140 of the roll suspension arrangement 25 relative to the carrier frame 95 and lift linkage assembly 90. The exemplary system 150 includes a first fluid line 155 connected to receive a pressurized fluid flow from a conventional fluid drive source 160 (see FIG. 1) located at a tow vehicle 165 (also illustrated in dashed line and by reference 165 in FIG. 1). In addition to connection to the system 150, the fluid drive source 160 (see FIG. 1) is connected in fluid communication via fluid line 170 to drive operation of the actuator mechanisms 85 configured to move the booms 70 and 75 of the assembly 30 in the horizontal direction between folded and extended positions (illustrated in FIG. 5). The fluid drive source 160 (see FIG. 1) is further connected in fluid communication via third fluid line 175 to drive operation of the actuator mechanisms 130 so as to move the carrier frame 95 and boom assembly 30 between raised and lowered positions (illustrated in FIG. 5). The system 150 may further include one or more miscellaneous springs (not shown) and/or mechanical shocks (not shown) and/or gas-charged shocks (not shown) or the like configured to enhance isolation of vibration and miscellaneous forces from transmission between the boom assembly 30 and the carrier frame 95.

Referring specifically to FIG. 1, the fluid line 155 is in fluid communication with a left-hand circuit 185 connected in parallel to a right-hand circuit 190. The left-hand and right-hand circuits 185 and 190, respectively, are operatively configured to apply forces at opposed lateral distances from the pivot connection 140 so as to control oscillating movement of the boom assembly 30 about the suspension arrangement 25. The left-hand circuit 185 includes a pressure regulating valve 192, and right-hand circuit includes a pressure regulating valve 194. The pressure regulating valves 192 and 194 are selectively adjustable by an operator either manually at the valve or from a remote controller 195 located at the tow vehicle 165 so as to regulate a desired fluid pressure of the left-hand and right-hand circuits 185 and 190, respectively, of the system 150 in a manner so as to control a degree of restraint or resistance exerted by the system 150 so as to accommodate varying types of terrain. Generally equal set fluid pressures between the pressure regulating valves 192 and 194 causes generally equal and opposite forces on opposing sides of the boom assembly 30 so as to balance the boom assembly 30 at a generally horizontal alignment. For example, when operating in rough terrain, the operator may adjust the pressure regulating valves 192 and 194 so as to increase the fluid pressure of the left-hand and right-hand circuit 185 and 190, respectively, of the system 150 in a manner that increases resistance or restraint of oscillating movement of the boom assembly 30 about the pivot connection 140 of the suspension arrangement 25. When traveling over more smooth terrain, an operator may adjust the pressure regulating valves 192 and 194 so as to decrease the fluid pressure in the left-hand and right-hand circuits 185 and 190 of the system 150 in a manner that reduces resistance or restraint to movement of the boom assembly 30 about the pivot connection 140 of the suspension arrangement 25. Pressure sensors 196 and 198 are located to indicate a fluid pressure of the at the left-hand and right-hand circuits 185 and 190, respectively of the system 150 as controlled by the pressure regulating valves 192 and 194, respectively.

Although the following description is generally in reference to the left-hand circuit 185 in relation to the boom assembly 30 and the suspension arrangement 25, one skilled in the art would understood that the right-hand circuit 190 is of a similar construction and operates in similar manner with respect to the boom assembly 30 and suspension arrangement 25.

The left-hand circuit 185 includes an accumulator 200 connected in series with a metered orifice 205, which both are parallel connected in fluid communication with an cylinder actuator 210. The accumulator 200 is a conventional cylinder pre-charged to a pre-determined pressure with a fluid or gas that is different than the fluid flow through the system 150. The metered orifice 205 is located to adjustably restrict fluid flow between the accumulator 200 and the cylinder actuator 210. In a similar construction, the right hand circuit 190 includes an accumulator 215 is connected in series with a metered orifice 220, which both are parallel connected in fluid communication with an actuator 225. The preferred metered orifices 205 and 220 are needle valves. Yet, the metered orifices 205 and 220 can be a remotely controlled pulse-width modulated control valves or another type of control valves and is not limiting on the invention. The metered orifices 205 and 220 can be manually adjustable or remotely controlled from the remote controller 195 located at the tow vehicle 165.

The system 150 further includes an accumulator discharge valves 226 and 227 connected in fluid communication with the accumulators 200 and 215, respectively. The accumulator discharge valves 226 and 227a are each configured to automatically "bleed off" or release pressurized fluid flow from the respective accumulator 200 and 215 upon detecting a loss of pressurized fluid flow from the fluid drive source 160.

Figure 2:
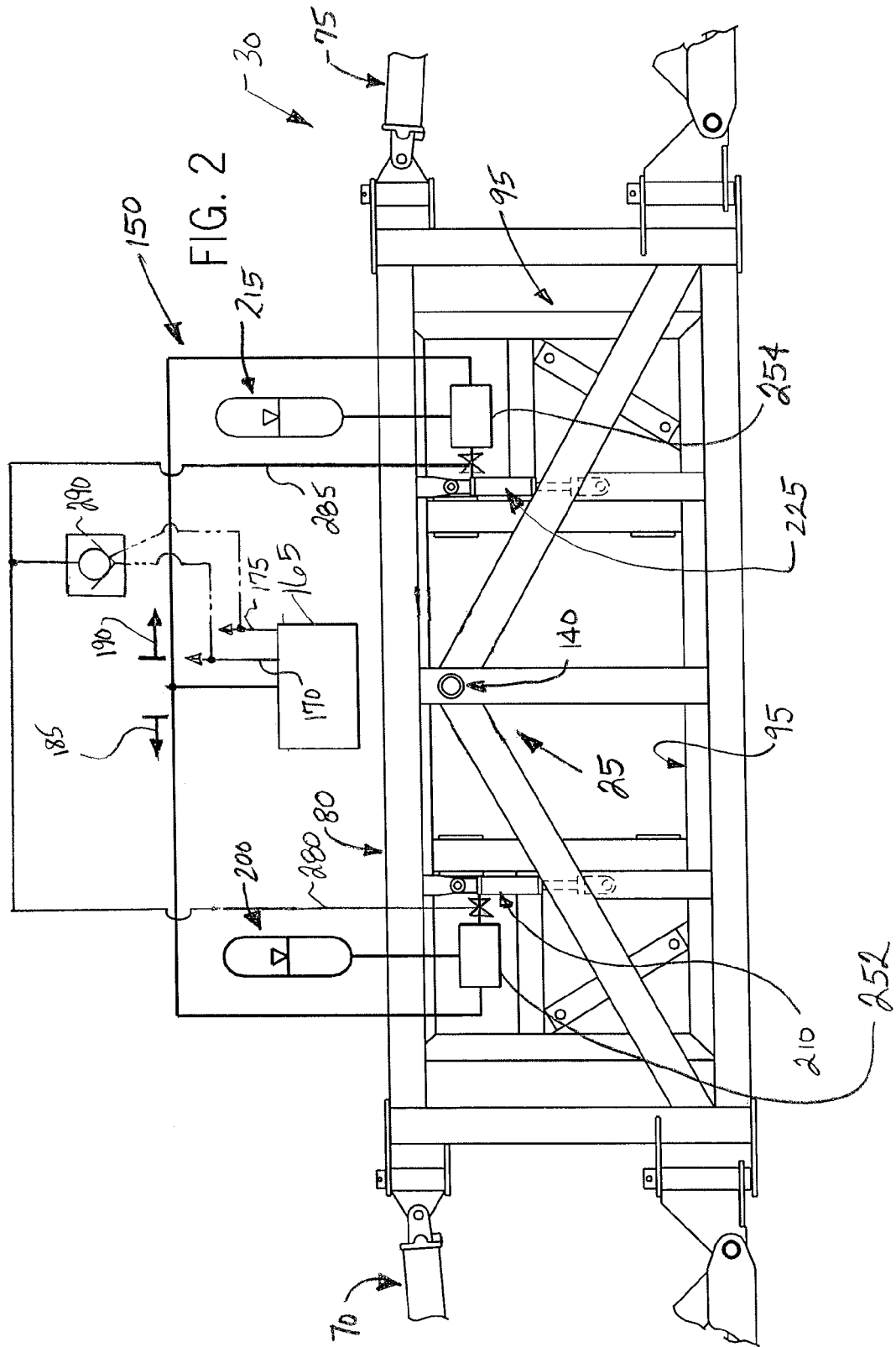
FIG. 2 illustrates a rearward elevation view of the lock system of the present invention employed in combination with a roll suspension arrangement on an agricultural sprayer supporting a boom assembly, the boom assembly in an extended, operative position.
Figure 3:
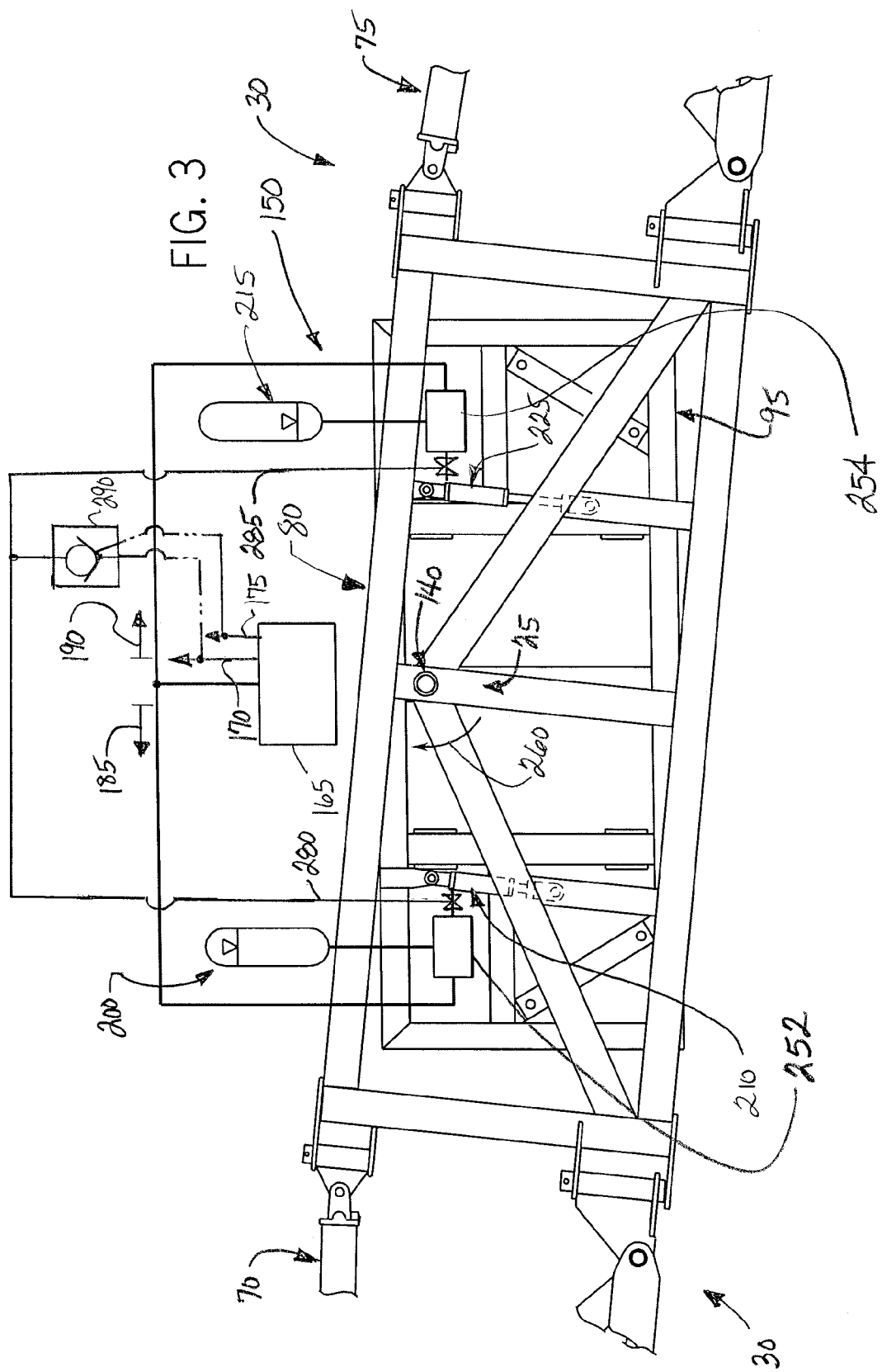
FIG. 3 illustrates a rearward side elevation view of the lock system employed in combination with the roll suspension arrangement on the agricultural sprayer supporting the boom assembly of FIG. 2, the boom assembly in an extended, operative position rotated in a clockwise direction.
Figure 4:
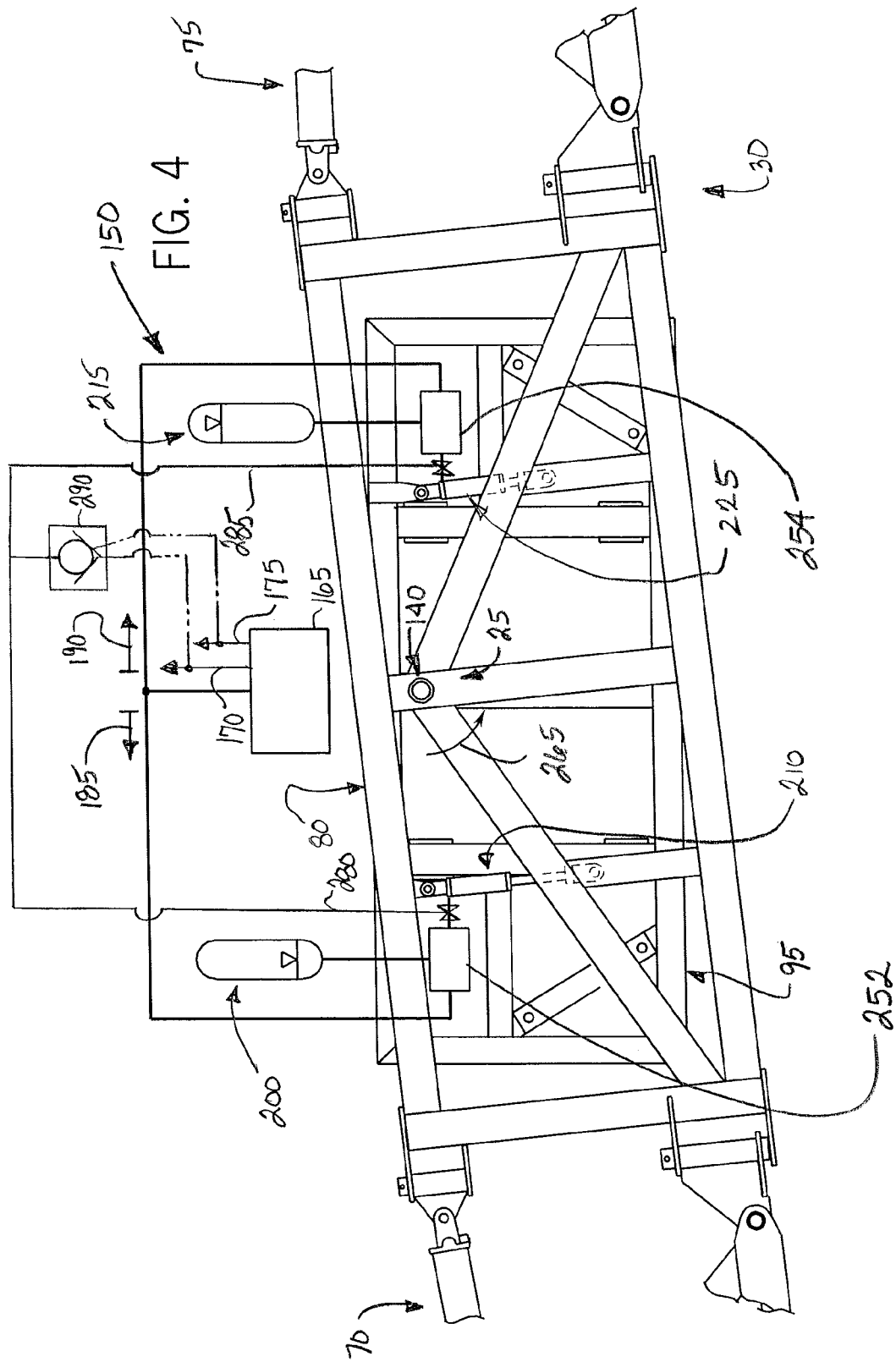
FIG. 4 illustrates a rearward side elevation view of the lock system employed in combination with the roll suspension arrangement on the agricultural sprayer supporting the boom assembly of FIG. 2, the boom assembly in an extended, operative position rotated in a counter-clockwise direction.

As illustrated in FIG. 1, the left-hand cylinder actuator 210 is a linear-actuated cylinder that includes a cylinder portion 230 and a rod end 235 movable in a linear direction (illustrated by arrow and reference 240) with respect to the cylinder portion 230. As shown in FIGS. 2-4, the cylinder portion 230 of cylinder actuator 210 is connected at the carrier frame 95, and the rod end 235 is connected at the central frame 80 of the boom assembly 30. The left-hand cylinder actuator 210 is located laterally offset in a horizontal direction from the pivot connection 140 of the suspension arrangement 25, and the right-hand actuator 225 is located laterally offset in an opposite horizontal direction from the pivot connection 140 relative thereto. Alternatively, the fluid cylinder actuators 210 and 225 can be combined into a double-extendible rod actuator having a single cylinder portion operatively connectively to move spaced apart rods connected at opposite left-hand and right-hand lateral distances from the pivot connection 140.

Still referring specifically to FIG. 1, the left-hand circuit 185 also includes a check valve 245 located to prevent fluid flow from the left-hand circuit 185 to the right-hand circuit 190. As such, the check valve 245 restricts one-way fluid flow and maintains a selected fluid pressure, as selectively controlled by the pressure regulating valve 192, in fluid lines connecting the accumulator 200, the metered orifice 205, and the cylinder actuator 210. In a similar manner, the right-hand circuit 190 includes a check valve 250 that restricts one-way fluid flow and generally maintains the selected fluid pressure in fluid lines connected between the accumulator 215, the metered orifice 220, and the actuator 225. The exemplary check valves 245 and 250 are pilot-operated, and spring-biased toward a closed position. For sake of illustration, the combination of the pressure regulating valve 192, the pressure sensor 196, the metered orifice 205, the accumulator discharge valve 226, check valve 228, and the check valve 245 in FIG. 1 is shown by reference 252 in FIGS. 2-4. In a similar manner, the combination of the pressure regulating valve 194, the pressure sensor 198, the metered orifice 220, the accumulator discharge valve 227, the check valve 229, and check valve 250 in FIG. 1 is shown by reference 254 in FIGS. 2-4.

The pressure regulating valves 185 and 190 generally set at fluid pressure values so as to prevent the communication of a fluid flow from the drive source 160 at a pressure which would cause the cylinder actuators 210 and 225 to initiate movement of the boom assembly 30 about the pivot connection 140 of the suspension arrangement 25. Instead, the pressure regulating valves 192 and 194 are set at fluid pressure values such that the cylinder actuators 210 and 225 are free to react as sensors mechanisms operable to detect pivotal movement of the boom assembly 30 about the pivot connection 140 of the suspension arrangement 25.

In example and as illustrated in FIG. 2, assume that the lift linkage assembly 90 holds the carrier frame 95 and attached booms 70 and 75 of the boom assembly 30 in a lowered, operative position (See FIG. 5) for spraying and distribution of product across the field. Also assume that the accumulators 200 and 215 are pre-charged to generally the same pressure, that the pressure regulating valves 192 and 194 are set at generally equal pressure settings, and that the terrain is generally level such that the boom assembly 30 and the carrier frame 95 are generally aligned with one another and horizontal aligned in parallel to the ground contour. Alternatively, the accumulators 200 and 205 can be pre-charged at different pressures relative to one another and/or the pressure-regulating valves 192 and 194 set at different pressure settings relative to one another in a manner that biases alignment of the boom assembly 30 at angle differing from general horizontal alignment in parallel with the carrier frame 95 and/or the ground contour. This embodiment may be desirable when operating the implement 35 along a side of a hill, for example.

Referring now to FIG. 3, assume that the implement 35 is traveling over a sloped-terrain such that miscellaneous gravitational forces cause the boom assembly 30 to rotate in a clockwise direction (illustrated by arrow and reference 260) about pivot connection 140 of the suspension arrangement 25 relative to the carrier frame 95. The clockwise rotation of the boom assembly 30 relative to the carrier frame 95 causes the cylinder actuator 210 to compress, forcing fluid from the cylinder portion 230 of the cylinder actuator 210 to the accumulator 200. The metered orifice 205 restricts the fluid flow into the accumulator 200, which translates to a linear force at the cylinder actuator 210 in a direction opposite to the compression of the cylinder actuator 210 that slows the pivotal movement of the boom assembly 30 relative to the carrier frame 95. Also, the pre-charged accumulators 200 and 215 exert typically equal and opposite centering forces on the cylinder actuators 210 and 225, and thereby resists the miscellaneous inertial forces associated with pendulum or rocking movement of the boom assembly 30 about the suspension arrangement 25 and causes the boom assembly 30 to self-center in a generally horizontal alignment parallel to the ground.

In a similar yet opposite manner, the clockwise rotation 260 of the boom assembly 30 causes extension of the actuator 225, creating a vacuum at the cylinder portion 230 which draws a fluid flow from the accumulator 215. The metered orifice 220 restricts the fluid flow leaving the accumulator 215, creating a force that resists and slows the clockwise pivotal rotation 260 of the boom assembly 30 about the suspension arrangement 25. If the boom assembly 30 oscillates or moves in an opposite direction about the pivot connection 140, the pressurized accumulator 215 exerts a damping force that resists the fluid flow leaving the actuator 225.

In accordance with the above description, the accumulators 200 and 215 of the system 150 absorb the miscellaneous inertial forces associated with causing pendulum- or rocking-type movement of the boom assembly 30 about the suspension arrangement 25, as well apply generally equal and opposite centering forces that bias the boom assembly 30 toward a self-center position in a horizontal alignment parallel to the carrier frame 95 and the ground.

FIG. 4 illustrates operation of the system 150 with counter-clockwise pivotal rotation (illustrated by arrow and reference 265) of the boom assembly 30 about the suspension arrangement 25 with respect to the carrier frame 95. The counter clockwise rotation 265 of the boom assembly 30 causes the cylinder actuator 210 to contract in a manner that forces fluid flow from cylinder actuator 210 through the metered orifice 205 and into the accumulator 200. The counter-clockwise pivoting boom assembly 30 also causes the actuator 225 to extend, forcing fluid flow from the accumulator 215 through the metered orifice 220 to the actuator 225. The pre-charged accumulators 200 and 215 in combination with the metered orifices 205 and 220, respectively, slows the pivotal movement of the boom assembly 30 and furthermore dampens the oscillating pendulum movement of the boom assembly 30 about the suspension arrangement 25, in a similar manner as described above in regard to reaction of the system 150 to clockwise rotation of the boom assembly 30.

Referring back to FIG. 1, the lock system 20 of the invention is configured to operate in combination with the system 150 to secure a position of the boom assembly 30 about the roll suspension arrangement 25 with respect to the carrier frame 95. The preferred embodiment of the lock system 20 is fluid-driven between open and closed positions. The type of fluid (e.g., hydraulic or pneumatic) can vary. Alternatively, the lock system 20 is electrically-driven between open and closed positions.

As shown in FIG. 1, the exemplary lock system 20 of the present invention generally includes lock valves 270 and 275 connected in fluid communication between metered orifices 205 and 220 and the cylinder actuators 210 and 225, respectively, of the system 150. In a closed position, the lock valves 270 and 275 prevent fluid flow therethrough so as to restrain movement of the cylinder actuators 210 and 225, respectively, and thereby restrain rotation of the boom assembly 30 about the suspension arrangement 25 with respect to the carrier frame 95. In an open position, the lock valves 270 and 275 permit operation of the system 150 and the suspension arrangement 25 as described above. The open-positioned lock valves 270 and 275 allow fluid flow therethrough, thereby freely allowing movement of the cylinder actuators 210 and 225, respectively, associated with operation of the system 150 in cushioning rotation of the boom assembly 30 about the suspension arrangement 25 with respect to the carrier frame 95.

The preferred lock valves 270 and 275 are biased to an open position. Each of the lock valves 270 and 275 are in fluid communication with pilot lines 280 and 285. However, the pilot lines 280 and 285 are not in fluid communication with the cylinder actuators 210 and 225, respectively. Each of the pilot lines 280 and 285 communicates a signal indicative of movement of the boom assembly 30 from the extended position to the folding position. In response to this signal, the lock valves 270 and 275 move from open to closed positions so as to prevent fluid flow to and from the actuator cylinders 210 and 225, which restrains movement of the boom assembly 30 about the pivot connection 140 of the suspension arrangement 25 with respect to the carrier frame 95.

The preferred lock system 20 further includes a pilot operated check valve 290 in fluid communication with fluid lines 170 and 175. The pilot operated check valve 290 is generally configured to retain pressure so as to selectively hold the lock valves 270 and 275 in the closed positions. The pilot operated check valve 290 is connected to communicate the signal in a fluid form via fluid lines 280 and 285 to lock valves 270 and 275, respectively. The signal represents indication of movement of one or both of the booms 70 and 75 of the boom assembly 30 by pivot actuator mechanism(s) 85 in the horizontal direction between folded and extended positions, or indication of movement of movement of the boom assembly 30 by the conventional lift actuator mechanism(s) 130 in the vertical direction. The pilot operated check valve 290 is configured to remain in the open position as long as pressurized fluid flow is provided to drive the actuator mechanisms 85 so as to move the left and right booms 70 and 75, respectively, of the boom assembly 30 in the horizontal direction or to drive the conventional lift actuator mechanism(s) 130 so as to move the boom assembly 30 in the vertical direction. Upon interruption of the pressurized fluid flow from the pressure or fluid drive source 160 to drive the actuator mechanism 85 or 130, the pilot operated check valve 290 in the closed position automatically will maintain fluid pressure in the pilot lines 280 and 285 so as hold the lock valves 270 and 275, respectively, in the closed position. Upon manual or remote adjustment from the controller 195 to move the pilot operated check valve 290 to an open position, the fluid pressure is relieved so as to allow the lock valves 270 and 275 to open and allow the booms 70 and 75 of the boom assembly 30 to freely pivot about the suspension arrangement 25.

In operation, assume for example that the lift linkage assembly 90 holds the carrier frame 95 and attached booms 70 and 75 of the boom assembly 30 in a lowered, operative position (See FIG. 5) for spraying and distribution of product across the field. When finished with field operation, the operator activates the lift actuator mechanism 130 to cause the lift linkage assembly 90 to move the carrier frame 95 and the attached boom assembly 30 to the raised, inoperative position. In the raised position, the operator activates the actuator mechanisms 85 to move booms 70 of the boom assembly 30 from the extended position to the folded position. To move the booms 70 and 75 in the horizontal direction to the folded position, the drive source 160 provides a fluid flow at a pressure to extend the actuator mechanism 85 so as to move the booms 70 and 75. The fluid flow and pressure to drive the actuator mechanisms 85 or the actuator mechanisms 130 is sensed by the lock valves 270 and 275. The pressurized fluid flow acts as the signal indicative of movement of the booms 70 and/or 75 of the boom assembly 30. The signal causes the lock valves 270 and 275 each to move from a normally open position to a closed position, preventing fluid flow to and from the actuator cylinders 210 and 225, respectively, and thereby restraining movement of the boom assembly 30 about the pivot connection 140 of the suspension arrangement 25. The lock valves 270 and 275 remain in their closed or locked positions as the pressurized fluid flow is transmitted to drive the actuator mechanisms 85 or the actuator mechanism 130. Once the booms 70 and 75 are positioned in the folded position ready for transport, pressurized fluid flow is interrupted to the actuator mechanism 85 and the actuator mechanisms 130. Yet upon loss of fluid pressure to the actuator mechanisms 85 or 130, the pilot operated check valve 290 automatically remains in the closed position so as to maintain fluid pressure in the lines 280 and 285 and thereby hold the lock valves 270 and 275 in closed positions in restraint of movement of the boom assembly 30. Selective manual or remote adjustment by the operator to move the pilot operated check valve 290 to an open position will relieve the fluid pressure in the lines 280 and 285, interrupting the signal so as to allow the lock valves 270 and 275 to bias to a normally open position. In the open position, the lock valves 270 and 275 allow free communication of fluid flow to and from the actuators 210 and 225, respectively, such that the booms 70 and 75 of the boom assembly 30 can freely pivot about the suspension arrangement 25. Also, it should be understood that the lock valves 270 and 275 are configured to intermittently close (via manual adjustment or remote adjustment from the controller 195) in the field so as to selectively restrain the boom assembly 30 from moving about the suspension arrangement 25.

Although the above description of the lock system 20 is described in combination with the exemplary system 150, one or more components of the system 150 can be added or removed and is not limiting on the invention. For example, the lock valves 270 and 275 can also be configured to move under pulse-width modulated control so as to replace, or connected in addition to, the metered orifices 205 and 220. Thereby, the lock valves 270 and 275 can alternatively be electronically controlled using a pulse-width modulated control modulation via a signal from the remote controller 195 so as to selectively lock the suspension arrangement 25 as well as to provide a desired level of damping by the system 150.

While the invention has been shown and described with respect to particular embodiments, it is understood that alternatives and modifications are possible and are contemplated as being within the scope of the present invention. For example, although the above-described lock valves 270 and 275 of the lock system 20 are described as hydraulically controlled, one skilled in the art will recognize that the present invention is not so limited. Alternatively, the lock valves 270 and 275 of the lock system 20 can be electrically- or pneumatically-driven in responsive to signals indicative of movement of the boom assembly between extended and folded positions. In another example, although the lock system 20 is described in reference to an agricultural sprayer, one skilled in the art will recognize that the present invention is not so limited. A wide variety of boom support implements 35 and/or vehicles could employ the lock system 20 of the invention. In addition, although a certain suspension arrangement 25 is described operatively connected between the carrier frame 95 and the boom assembly 30, it should be understood that the lock system 20 of the present invention can be employed to restrain a wide variety of suspension arrangements 25 and is not limiting on the invention.

Many changes and modifications could be made to the invention without departing from the spirit thereof. The scope of these changes will become apparent from the appended claims.

We claim:

1. A system configured to restrain pivoting of a boom assembly about a horizontal, fore-and-aft aligned axis defined by a roll suspension arrangement independently of a carrier frame, the system comprising:
    an actuator cylinder in isolated fluid communication with an accumulator, the actuator cylinder having a first end connected at the carrier frame and a second end connected at the boom assembly and movable in a linear direction relative to the first end; and
    a lock valve connected in fluid communication between the accumulator and the actuator cylinder,
    wherein the lock valve in a closed position prevents a fluid flow therethrough so as to restrain movement of the actuator cylinder and rotation of the boom assembly with respect to the carrier frame, and wherein the lock valve in an open position releases movement of the actuator cylinder such that the boom assembly pivots about the fore-and-aft axis independently of the carrier frame.

2. The lock system as recited in claim 1, wherein the lock valve is in fluid communication with a pilot line, wherein the pilot line is not in fluid communication with the actuator cylinder, wherein the pilot line communicates a signal indicative of movement of the boom assembly from the extended position to the folding position, and wherein in response to the signal, the lock valve moves from the open position to the closed position so as restrain movement of the boom assembly with respect to the carrier frame.

3. The lock system as recited in claim 2, wherein the lock valve in the closed position prevents the fluid flow to and from the actuator cylinder.

4. The lock system as recited in claim 2, wherein the lock valve is biased to an open position.

5. The lock system as recited in claim 2, further comprising a pilot operated check valve connected in fluid communication with the lock valve so as to automatically maintain a fluid pressure to hold the lock valve in the closed position.

6. The lock system as recited in claim 5, wherein the pilot operated check valve remains in the closed position upon loss of the signal indicative of movement of the boom assembly between the extended, operative position and the folded, inoperative position.

7. The lock system as recited in claim 1, wherein the lock valve is electrically-driven to move between open and closed positions.

8. The lock system as recited in claim 1, wherein the lock valve is hydraulically driven to move between open and closed positions.

9. An agricultural sprayer, comprising:
    a boom assembly that includes a central frame in pivotal support of each of a first boom located opposite a second boom between an extended position and a folded position about a vertical axis;
    a roll suspension arrangement including a pivot which defines a generally horizontal, fore-and-aft aligned axis about which the boom assembly rotates independently of a carrier frame;
    a dampening system configured to slow movement of the boom assembly about the roll suspension arrangement in relation to the carrier frame, the dampening system including an actuator cylinder configured to transfer a fluid flow solely with an accumulator, the actuator cylinder having a first end and a second end movable in a linear direction with respect to the first end, the first end connected at the carrier frame and the second end connected at the boom assembly; and
    a lock system configured to restrain movement of the actuator cylinder of the dampening system and the boom assembly, the lock system including a lock valve in fluid communication between the actuator cylinder and the accumulator,
    wherein the lock valve in a closed position prevents the fluid flow therethrough so as to restrain movement of the actuator cylinder and pivoting of the boom assembly about the suspension arrangement independently of the carrier frame, and wherein the lock valve in an open position releases movement of the actuator cylinder and pivoting of the boom assembly about the roll suspension arrangement independently of the carrier frame.

10. The agricultural sprayer as recited in claim 9, wherein the lock valve is in fluid communication with a pilot line, wherein the pilot line is not in fluid communication with the actuator cylinder, wherein the pilot line communicates a signal indicative of movement of the boom assembly from the extended position to the folding position, and wherein in response to the signal, the lock valve moves from the open position to the closed position so as restrain movement of the boom assembly with respect to the carrier frame.

11. The agricultural sprayer as recited in claim 9, wherein the lock valve in the closed position prevents the fluid flow to and from the actuator cylinder.

12. The agricultural sprayer as recited in claim 9, wherein the lock valve is biased to an open position.

13. The agricultural sprayer as recited in claim 2, further comprising a pilot operated check valve having an open position that allows transmission of a signal to the lock valve, the signal indicative of movement of one of the booms of the boom assembly between the extended and the folded positions, the pilot operated check valve in the closed position configured to maintain a fluid pressure so as to hold the lock valve in the closed position.

14. The agricultural sprayer as recited in claim 13, wherein in response to the signal, the lock valve moves from a normally open position to a closed position so as to restrain movement of the boom assembly about the roll suspension arrangement with respect to the carrier frame.

15. The agricultural sprayer as recited in claim 13, wherein the pilot operated check valve remains in the open position when the boom assembly moves between the extended, operative position and the folded, inoperative position.

16. The agricultural sprayer as recited in claim 9, wherein the lock valve is electrically-driven to move between open and closed positions.

17. The agricultural sprayer as recited in claim 9, wherein the lock valve is hydraulically driven to move between open and closed positions.

18. A method of restraining a boom assembly from moving independently about a roll suspension arrangement with respect to a carrier frame, the method comprising the steps of:
sensing a movement of the boom assembly between an extended position generally perpendicular to a direction of travel and a folded position generally in parallel with the direction of travel;
automatically transmitting a signal to a lock valve connected in fluid communication isolated between an actuator cylinder and an accumulator, the signal indicative of the movement of the boom assembly, the actuator cylinder having a first end connected at the carrier frame and a second end connected at the boom assembly; and
closing the lock valve in response to the signal so as to prevent a fluid flow therethrough,
wherein the lock valve in the closed position prevent a fluid flow to or from the actuator cylinder so as to restrain movement of the actuator cylinder and the boom assembly relative to the carrier frame.

19. The method as recited in claim 18, further comprising the step of:
sensing completion of movement of the boom assembly between the assembly between the folded and extended positions;
interrupting the signal to the lock valve in response to the step of sensing completion of movement;
wherein upon interruption of the signal, a check valve automatically maintains fluid pressure so as to hold the lock valve in the closed position in restraint of movement of the boom assembly about the suspension arrangement.

20. The method as recited in claim 18, further comprising the step of transmitting a pulse width modulated signal so as to selectively cause the lock valve to partially close as designated by the pulse width modulated signal so as selectively regulate a desired level of resistance to movement of the boom assembly about the suspension arrangement.

* * * * *